US010684347B2

(12) United States Patent
Mengwasser (10) Patent No.: US 10,684,347 B2
(45) Date of Patent: Jun. 16, 2020

(54) SYSTEMS AND METHODS FOR MEASURING TERRESTRIAL SPECTRUM FROM SPACE (71) Applicant: Aurora Insight Inc., Washington, DC (US)

(72) Inventor: Brian Thomas Mengwasser, Washington, DC (US)

(73) Assignee: AURORA INSIGHT INC., Washington, DC (US)

(*) Notice: Subject to any disclaimer, the term of this patent is extended or adjusted under 35 U.S.C. 154(b) by 0 days.

(21) Appl. No.: 15/585,102

(22) Filed: May 2, 2017

(65) Prior Publication Data

US 2017/0264381 A1 Sep. 14, 2017

Related U.S. Application Data (60) Provisional application No. 62/305,513, filed on Mar. 8, 2016.

(51) Int. Cl.
*H02J 50/20* (2016.01)
*G01S 1/68* (2006.01)
(Continued)

(52) U.S. Cl.
CPC ............. *G01S 1/68* (2013.01); *G01S 1/024* (2013.01); *H04B 7/18513* (2013.01)

(58) Field of Classification Search
CPC combination set(s) only.
See application file for complete search history.

(56) References Cited

U.S. PATENT DOCUMENTS 5,500,648 A * 3/1996 Maine ................ G01S 5/12
342/357.78
5,561,838 A * 10/1996 Chandos ............ H04B 7/18541
455/12.1
(Continued)

FOREIGN PATENT DOCUMENTS

CA 2715155 A1 3/2011
CN 103973607 A 8/2014
(Continued)

OTHER PUBLICATIONS

Hawkeye 360, "Geolocation of RF Emitters With a Formation-Flying Cluster of Three Microsatellites", Aug. 9, 2016, pp. 16.
(Continued)

*Primary Examiner* — Cindy Trandai
(74) *Attorney, Agent, or Firm* — Brian R. Galvin; Brian S. Boon; Galvin Patent Law LLC (57) ABSTRACT Energy, data and information is obtained about the state of the electromagnetic spectrum and the nature of terrestrial transmissions through the use of a remote spectrum sensing system. The disclosure comprises at least one satellite in orbit around Earth capable of sensing frequencies in use by terrestrial transmitters such as those used for radiocommunication or radiodetermination services. In addition, various processing functions are applied to the collected energy, data and information before and/or after they are relayed to at least one ground station in order to reveal a greater understanding of the state of the spectrum and nature of transmissions. The disclosure relates to the described system in multiple embodiments and the method for obtaining energy, data and information about terrestrially used spectrum with such a system.

17 Claims, 5 Drawing Sheets (51) Int. Cl.
*G01S 1/02* (2010.01)
*H04B 7/185* (2006.01)

(56) References Cited

U.S. PATENT DOCUMENTS

| | | | | |
|---|---|---|---|---|
| 5,940,739 A * | 8/1999 | Conrad | H04B 7/18519 | 455/13.1 |
| 6,020,845 A * | 2/2000 | Weinberg | H01Q 1/288 | 342/354 |
| 6,067,453 A * | 5/2000 | Adiwoso | H04B 7/18578 | 455/12.1 |
| 6,147,644 A * | 11/2000 | Castles | H04B 7/18547 | 342/357.55 |
| 6,249,513 B1 * | 6/2001 | Malarky | H04B 7/18521 | 370/316 |
| 6,511,020 B2 * | 1/2003 | Higgins | B64G 1/1007 | 244/158.4 |
| 6,675,011 B1 * | 1/2004 | Kita | H04B 7/18541 | 342/357.31 |
| 7,236,092 B1 * | 6/2007 | Joy | A61B 5/07 | 340/539.12 |
| 9,086,471 B2 | 7/2015 | Mengwasser | | |
| 9,331,774 B2 * | 5/2016 | Chen | G08G 3/02 | |
| 2003/0189136 A1 * | 10/2003 | Maeda | B64G 1/1007 | 244/158.4 |
| 2006/0080819 A1 * | 4/2006 | McAllister | G06K 17/00 | 29/403.3 |
| 2008/0099625 A1 * | 5/2008 | Yocom | B64G 1/1085 | 244/158.4 |
| 2008/0218427 A1 * | 9/2008 | Dobosz | H04B 1/40 | 343/858 |
| 2009/0161797 A1 * | 6/2009 | Cowles | G08G 3/02 | 375/324 |
| 2010/0063733 A1 | 3/2010 | Yunck | | |
| 2011/0210890 A1 * | 9/2011 | Laine | G01S 19/08 | 342/357.58 |
| 2011/0222589 A1 * | 9/2011 | Howell | H04B 7/18519 | 375/213 |
| 2012/0263163 A1 | 10/2012 | Burzigotti et al. | | |
| 2014/0077036 A1 | 3/2014 | Healy | | |
| 2014/0218242 A1 * | 8/2014 | Platzer | G01S 5/0027 | 342/454 |
| 2014/0240497 A1 | 8/2014 | Shefer | | |
| 2014/0341586 A1 * | 11/2014 | Wyler | H04B 10/118 | 398/115 |
| 2014/0354443 A1 * | 12/2014 | Roberson | E21B 47/122 | 340/853.2 |
| 2014/0354477 A1 * | 12/2014 | Robinson | G01S 19/11 | 342/357.78 |
| 2015/0269474 A1 * | 9/2015 | Finn | G06K 19/07718 | 235/492 |
| 2015/0288068 A1 * | 10/2015 | Suematsu | H01Q 13/0258 | 343/776 |
| 2015/0311972 A1 * | 10/2015 | Mengwasser | H04B 7/18515 | 370/316 |
| 2015/0318884 A1 | 11/2015 | Nasta et al. | | |
| 2015/0355312 A1 | 12/2015 | Aymes et al. | | |
| 2016/0155073 A1 * | 6/2016 | Augenstein | G06Q 10/06314 | 705/7.24 |
| 2016/0179994 A1 * | 6/2016 | Levine | G06Q 30/02 | 703/2 |

FOREIGN PATENT DOCUMENTS

EA 201591173 A1 11/2015
WO 2014121197 A2 8/2014

OTHER PUBLICATIONS

Li et al., "A Preliminary Survey of Radio-Frequency Interference Over The U.S. in Aqua AMSR-E Data", "IEEE Transactions on Geoscience and Remote Sensing", Feb. 19, 2004, pp. 380-390, vol. 42, No. 2, Publisher: IEEE.

* cited by examiner

SYSTEMS AND METHODS FOR MEASURING TERRESTRIAL SPECTRUM FROM SPACE

CLAIM OF PRIORITY UNDER 35 U.S.C. §119

The present Application for Patent claims priority to Provisional Application No. 62/305,513 entitled "Systems and Methods for Measuring Terrestrial Spectrum from Space" filed Mar. 8, 2016, and assigned to the assignee hereof and hereby expressly incorporated by reference herein.

FIELD OF THE DISCLOSURE

The present disclosure relates generally to wireless signal monitoring. In particular, but not by way of limitation, the present disclosure relates to systems, methods and apparatuses for monitoring terrestrial wireless signals using satellites.

DESCRIPTION OF RELATED ART

Spectrum, or blocks of frequencies in the electromagnetic spectrum, is a finite natural resource and the foundation of wireless telecommunication. Numerous applications such as fixed station and mobile communications, radiolocation (e.g. with radar techniques) and emergency services depend on wireless frequencies in the radio and microwave frequency bands. The quality and availability of spectrum dictates network performance and growth potential for the wireless telecommunications industry. The exponential demand for mobile connectivity and corresponding scarcity of mobile spectrum makes managing spectrum even more critical. Identifying, reallocating, and sharing spectrum are now essential tasks for industry and regulators. At the same time, there is a desire to maximize efficiency of the existing spectrum by curtailing interference and through smart network planning.

Despite the value of spectrum for communications and radiolocation, the knowledge of how spectrum is used is low. While network operators monitor the performance of their service overall, and localized spot measurements can be taken with a spectrum analyzer, there is no system today which comprehensively measures the underlying spectrum. Indeed, it is difficult to measure spectrum on a wide basis since the nature of electromagnetic propagation results in variation of the state of the spectrum within a small geographical area. Widespread surveying with ground-based measurements is resultantly costly and impractical. Some attempts have been made to measure the spectrum with aerial platforms, such as helicopters; however this still involves significant time, effort and resources to measure a significant area.

Measuring the true state of the spectrum can reveal valuable information. Inventory of the spectrum provides useful data for efficient allocation of spectrum and assessment of its integrity. Communications activity is less efficient within spectrum when interference is present and thus data supporting analysis and eradication of interference directly augments the value of the service. Finally, examination of the spectrum itself reveals useful insights into the use of the spectrum, such as the existence and composition of given networks or radar sources and how these change over time. Thus, there is a need to devise new methods of measuring spectrum on a regional or global scale in order to maximize the use of the limited resource.

SUMMARY OF THE DISCLOSURE

The present disclosure addresses the need for a more efficient means to measure spectrum on a wide basis with a novel configuration of components. Rather than a series of spot measurements of spectrum at numerous places on the ground, spectrum can be more efficiently measured from above. Remote sensing systems are used to image the earth from space in order to understand land usage and human activity. Similarly, the present disclosure, aptly described as remote spectrum sensing, enables analysis of spectrum usage in a practical manner.

One component of the disclosure is at least one satellite in orbit around the Earth. Like other applications in space, satellite technology provides the advantage of a wide field of view and wide coverage area in exchange for the energy required to achieve orbit, which is desired to maximize the utility of the system. There are multiple suitable orbits for the satellite, largely depending on the nature of the transmissions to be sensed. In general a low Earth orbit which minimizes the distance between satellite and transmitters of interest is preferable.

The satellite in the present disclosure has the capability to receive energy from the surface of the Earth. Terrestrial telecommunications applications, such as fixed microwave links, mobile (cellular) communications or radar installations, typically consist of emitters which transmit energy at certain frequencies. The majority of these transmissions are aimed along the surface of the Earth. However, electromagnetic energy radiates outward in all directions and some of this energy reaches space. Digital television transmissions, for example, can be stronger in orbit than the signals from GPS satellites. Although the power density in space is lower than on the surface of the earth, the goal of the system is detection and characterization of transmissions rather than resolving the content of a given transmission and thus can be accomplished with a far lower received power density through digital signal processing.

In order to collect and measure energy transmitted on Earth, the disclosure implements a passive sensor on board the satellite. A passive sensor can consist of a suitable antenna and spectrum analyzer, which are tuned to the same frequencies as the transmissions of interest. The sensor can capture, store, process and/or output the received energy within the given field of view at an instant in time. As the satellite orbits the Earth, the field of view changes; thus providing different views of the same transmission over a short time span and providing coverage of a large geographical area over a long time span.

The received energy, or now data, can be useful on the Earth to the users of the sensed frequencies and other interested parties. Thus, the disclosure also consists of a mechanism by which the energy or data can be relayed to the Earth. This can be accomplished by a communications link between the satellite and a ground station on the earth, although there are other suitable mechanisms.

In order to analyze and interpret received information, the disclosure also employs multiple digital processing functions. Processing functions can be executed on the satellite or on the ground, or in multiple locations. The communications link between the satellite and the ground station often limits the data throughput, due to practical constraints (e.g. available power and communications frequencies), thus it is sometimes preferred to do some processing in-space.

However, in-space processing likewise can include additional resources (e.g. power and processing hardware) and sometimes limits the system functionality.

In particular, the disclosure includes several optional processing functions: enhancement of the parameters of a transmission (e.g. averaging or multiplication) given low received power spectral density; independent detection and excision of individual transmissions since multiple transmissions may be received simultaneously; data reduction or decimation (e.g. filtering) to minimize data relayed to the Earth; calculation and estimation of various parameters of the transmissions (e.g. power density, bandwidth, origin); and registration and visualization of the resulting information in a user interface. The system can generate a large quantity of data, depending on the duty cycle, range of frequencies and sensor precision. Thus, transformation of the data through processing is one aspect of the disclosure and is intended to enhance the utility of the information.

The present disclosure addresses the need for greater ability to measure spectrum resources, particularly that spectrum which is used for terrestrial telecommunications and radiolocation applications. Although satellites are frequently utilized for communications, navigation, imaging and scientific observation, they are not presently used to sense and characterize terrestrial transmissions. Likewise, remote sensing satellites utilize optical or infrared wavelengths for imagery, or utilize space-based radar to characterize physical features on the Earth but do not measure energy in radio wavelengths normally used by terrestrial applications. Furthermore, there is no known system which is capable of practically and efficiently measuring spectrum across a wide geographical area. The present disclosure has numerous advantages over existing solutions such as intra-system network analytics and ground-based spot measurements. The present disclosure allows for measurement of transmissions independently of the network and thereby improves its utility as a planning and diagnostic tool. Lastly, in contrast to ground based measurements which can be impractical over wide areas, given the significant time and effort required, the present disclosure makes wide-spread sensing of spectrum resources feasible and the analysis of large telecommunications networks viable.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

The present disclosure relates to telecommunications. More particularly, the present disclosure discusses passive monitoring of terrestrial telecommunication activity with one or more remote sensing satellites and digital signal processing.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 1:
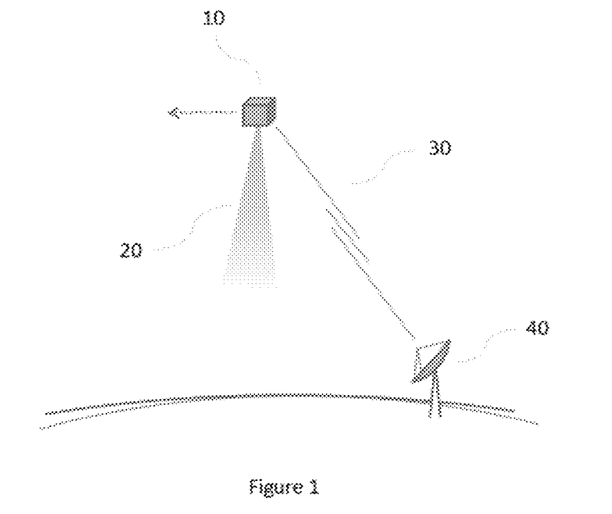
FIG. 1 is a schematic system diagram depicting a sensing satellite communicating with a ground station.
Figure 2:
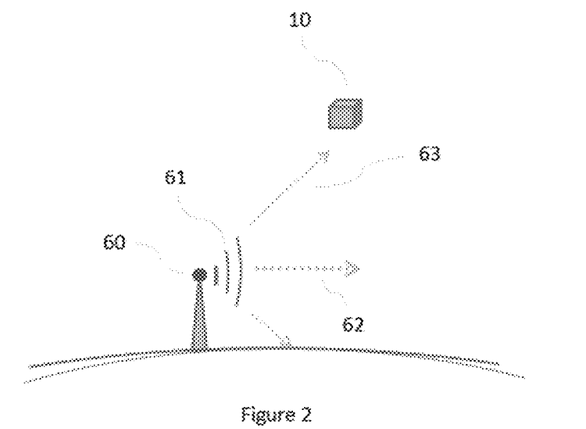
FIG. 2 is a schematic system diagram depicting a sensing satellite receiving a portion of energy from a terrestrial transmitter which has propagated into space.

Describing the invention and specific embodiments in greater detail, FIGS. 1 and 2 schematically illustrate the physical components of the system. A satellite 10, in orbit around the earth, has some reception capability 20 which enables the satellite to sense a terrestrial transmitter 60. A terrestrial transmitter 60 emits electromagnetic energy 61 at a given frequency or set of frequencies. Depending on the nature of the service, the boresight of transmitter is typically oriented roughly along the surface of the Earth. Thus, energy 62 largely propagates roughly along the surface of the Earth. However, due to the nature of free-space electromagnetic propagation, portions of energy radiates in other directions, according to the radiation pattern of the emitter. The portions of energy 63 which are oriented away from the surface of the Earth reach the altitude of a satellite 10 and are detectable by the sensing capability 20 of the satellite.

Additionally in FIG. 1, in one embodiment, a communications link 30 is shown to a ground station 40. The communications link 30 can be active or inactive at any given time, depending on the duty cycle of the satellite and the relative position of the satellite 10 and the ground station 40. This communication link enables relaying energy, data or information which is collected by a satellite 10, ultimately to the users of the information on Earth. In another potential embodiment, there are numerous ground stations 40 dispersed around the planet which may enable the communications link 30 to be active more frequently as it is desired to maximize the amount of data collected by the system. In this case, a handoff of the communications link 30 between two ground stations 40 may occur.

Figure 3:
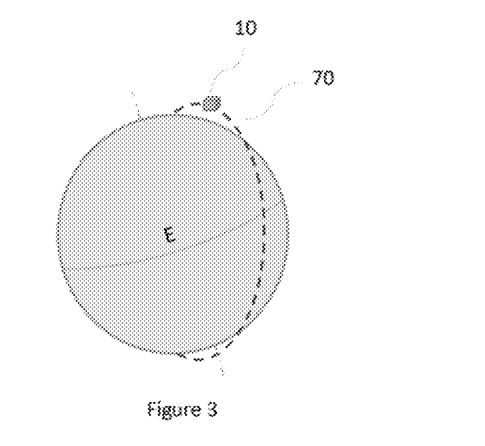
FIG. 3 is a schematic illustration of a single satellite in a low earth orbit.

In FIG. 3, the orbit 70 of a satellite 10 is depicted. In one embodiment, the orbit 70 is a low Earth orbit, which maintains a minimal distance between the satellite and the transmitters of interest while still maintaining a stable orbit. In a further embodiment, the orbit 70 has an inclination less than ninety degrees which maximizes the amount of time spent over populated areas of the planet while minimizing the energy cost of launching the satellite.

Figure 4:
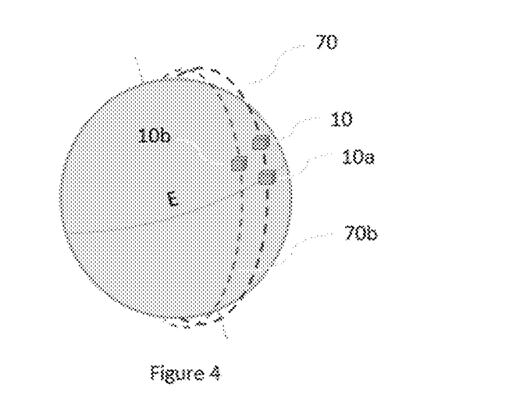
FIG. 4 is a schematic illustration of a satellite cluster which consists of multiple satellites in different low earth orbits.

In one embodiment, two or more satellites form a cluster of satellites and cooperate to sense energy. Cooperation between satellites yields several potential advantages, including improved coverage, improved resolution/sensitivity and/or improved ability to determine useful information about particular transmitters. FIG. 4 depicts three satellites 10, 10a, and 10b in slightly different orbits 70, 70a, and 70b.

In one particular embodiment of satellite cooperation, as depicted in FIG. 4, three such satellites have proximal orbits such that they are able to sense the same transmission but slightly differently. By subsequently processing the energy sensed by each satellite, and in particular comparing the amplitude, timing or frequency differences of received energy, additional information about the geographic disposition of transmitters can be revealed. Similarly by subsequently processing the energy sensed by each satellite and coherently combining that energy the sensitivity and resolution of the satellite system can be enhanced. In this case as depicted in FIG. 4, the orbit 70 of a given satellite 10 may have a different longitude of periapsis 70a than another satellite 10a or a different longitude of the ascending node 70b of a third satellite 10a, while each orbit 70, 70a, and 70b are approximately circular and have approximately the same altitude and inclination. This configuration is advantageous since the satellites will approximately orbit in formation due to having the same inclination, altitude and eccentricity without the additional expenditure of fuel. At the same time, by having linear distance between the satellites in multiple dimensions maximizes the difference in energy measured by each satellite of a given transmitter. However, depending on the desired performance improvement, the orbits of the cooperative satellites may take different forms.

For example, in another particular embodiment of satellite cooperation, two or more satellites are spaced apart in different orbits (i.e. a constellation of satellites) in order to provide a broader area of coverage. This configuration could employ for instance satellites with the same orbit, but having different arguments of periapsis or mean anomalies at a given time (i.e. string of pearls constellation). Satellites in this configuration may not be able to sense the same geographic area of the Earth simultaneously but would therefore increase the area sensed at a given time. And alternately put, would decrease the time before on satellite in the system could sense a given transmitter.

Figure 5:
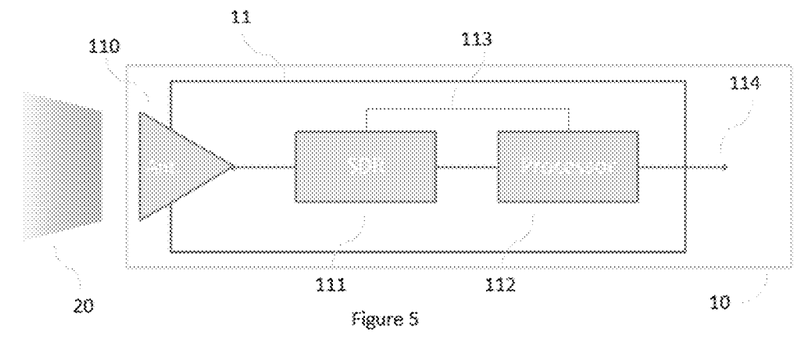
FIG. 5 is a schematic block diagram of a passive digital sensor.

FIG. 5 depicts one embodiment of a passive sensor 11, a component of a spacecraft 10, which is the mechanism which enables the ability to sense various frequencies 20. In this embodiment the passive sensor consists of an antenna 110 which is sensitive to the frequencies of interest. A software-defined radio (SDR) flexibly down-converts and digitizes received energy with an analogue to digital converter, such that the SDR can be tuned to specific frequency ranges with a control channel 113. A processing device 112 is able to digitally filter, process or store the received energy, as well as control the SDR via the control channel, before outputting data 114 to another subsystem. The control channel 113 may enable the SDR to execute a pre-programmed series of configurations or to be dynamically configured based on the received energy or commands originating at the ground station. There are numerous possible configurations of such a passive sensors, such as sensors having a plurality of antennas, receiver pathways and redundancies. It is particularly advantageous to have a sensor which is rapidly tunable to various frequency bands in order to maximize the flexibility and utility of the device after launch.

Figure 6A:
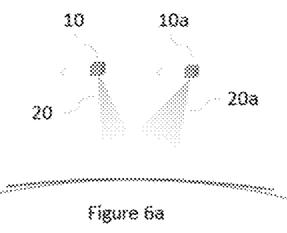
FIGS. 6a, 6b, and 6c are schematic illustrations of differing reception configurations on one or more satellites.

FIG. 6 depicts multiple potential configurations and orientations of the sensing capability 20 of a satellite 10. There are numerous possible implementations of antennas and sensing configurations, which have differing advantages, only a few of which have been described here. Each of the depicted configurations in FIG. 6 further more could be implemented on a single satellite or multiple satellites. In one embodiment depicted in FIG. 6a, the invention comprises multiple antennas which produce different reception capabilities: 20 which has a narrow field of view and 20a, which has a wider field of view, both of which are oriented at the same location on Earth. In particular in FIG. 6a, the antennas are implemented on different spacecraft, which as described above, enable sensing of the same transmitters from different angles.

Figure 6B:
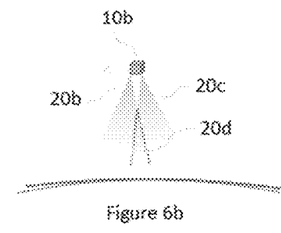

FIG. 6b depicts another embodiment wherein at least two antennas are configured such that the one reception capability 20b at least partially overlaps another 20c. In this embodiment, processing energy received from both 20b and 20c can provide enhancement (e.g. amplitude magnification) or additional information (e.g. angle of arrival due to difference in received phase) about transmissions received within the overlapping portion 20d.

Figure 6C:
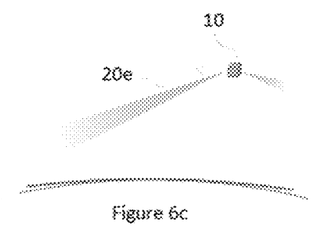

FIG. 6c depicts another configuration wherein the orientation of the sensing capability 20e is oriented nearly tangentially to the Earth rather than the nadir direction from the perspective of the satellite and rather. Since numerous terrestrial transmissions propagate primarily along the surface of the Earth, this approach may prove advantageous for certain transmission types at the cost of greater distance between transmitter and satellite. Indeed, in one particular embodiment, the satellite would have the ability to rotate orientations, by means of thrusters or momentum control devices, or rotate an individual antenna comprising a passive sensor in order to for instance toggle between different orientations of its sensing capabilities or track one location on the surface of the Earth during a given pass.

Figure 7A:
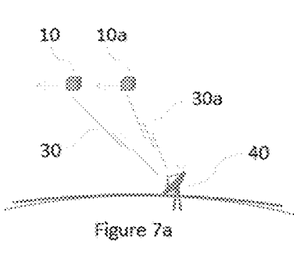
FIGS. 7a and 7b are schematic illustrations of differing means for communicating to a ground station.

As described above, the invention also comprises a communication link 30 to a ground station 40 in order to relay sensed energy or data. Communications links are typically on microwave or optical wavelengths and are enabled by a communications subsystem on the satellite 10. Standard communications subsystems at minimum consist of device to modulate data in a waveform, an amplifier, and a steerable or fixed transmission antenna. FIG. 7 schematically depicts two additional embodiments of communication links, in addition to that depicted in FIG. 1. In one embodiment depicted in FIG. 7a, one satellite 10 communicates 30 with a ground station 40 which tracks the motion of the satellite while a second satellite 10a also communications 30a to the same ground station. In the case that satellites are in close enough proximity (e.g. a cluster of FIG. 4) the same ground station is used thus simplifying the components of the system. The communications links utilize frequency, time or code division multiplexing to avoid causing intra-system interference.

Figure 7B:
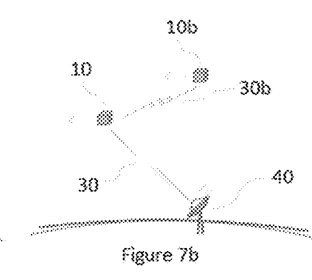

In another embodiment, depicted in FIG. 7b, a satellite 10b utilizes a particular type of communications link 30b, known as an intersatellite link, to relay data to another satellite 10. This satellite could be another satellite of Claim 10 or could be a data relay satellite external to the system. The relay satellite 10, in FIG. 7b, receives the intersatellite link, potentially further processes or combines with other energy or data and in turn communicates 30 to a ground station 40. This embodiment has advantages in certain circumstances in order to aggregate data thereby simplifying the system with fewer ground stations and/or in order to reduce the data through processing such that less data can be transmitted to the ground. A particular variation of this embodiment calls for one satellite to be a 'mother' satellite which communicates directly with, deploys, and/or controls one or more additional 'daughter' satellite, thereby making clusters of satellites easier to manage.

Processing is a critical component of generating useful information from received energy. Depending on the type of data and information desired, a number of different functions may be utilized. Processing can be performed on any suitable digital processors in space or on the Earth; different functions may in fact be performed in multiple locations in order to optimize the accuracy, minimize data transfer and maximize the ability to improve processing functions as technology advances.

Figure 8:
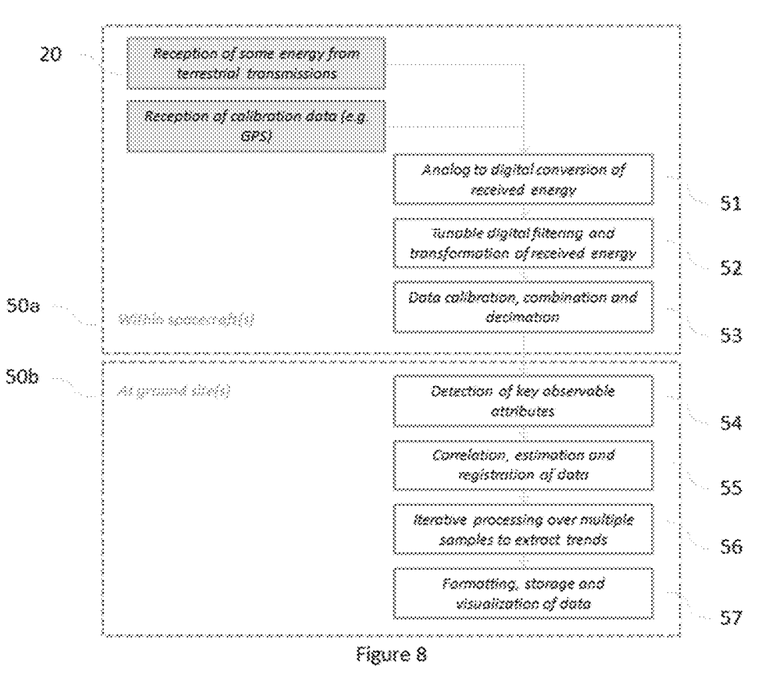
FIG. 8 is a flow diagram illustration of possible processing functions to interpret received energy.

FIG. 8 illustrates processing functions in one exemplary embodiment with a flow chart. Reception of energy 20 from terrestrial transmissions and calibration data is performed with reception subsystems on the satellite. In this embodiment several processing functions 50a are performed in space and additional functions 50b are performed on the ground after the relay of data to a ground station (not shown). After reception, analogue conditioning (e.g. downconversion or filtering) of the energy may be performed before the first processing function: analog to digital conversion of received energy 51, which samples the energy at a given rate and produces a digital representation of the energy. After digitization, portions of the data are sorted, separated and/or discarded with digital filtering functions 52 and transformation functions applied (e.g. Fourier transformation or ambiguity function). Multiple samples of data are then combined (e.g. time-averaging or multiplication), calibrated (e.g. with a second data channel) and decimated (e.g. by under-sampling the data) 53, in this embodiment, to minimize the amount of data for transmission to the ground station for additional processing. At this point in this embodiment, the data represents a digitally enhanced version of a portion of the energy received. Despite the linear flow of processing functions, multiple data sets from each function may be relayed for ground processing.

Continuing with the exemplary embodiment in FIG. 8, detection of numerous key features present in the data, such as bandwidth, power spectral density, doppler rate, modulation rate, among others, is performed 54. These features detectable within the data begin to enable an understanding of the spectrum: utilization, density, orientation to source. Since these data relate to the physical geometry of the terrestrial transmitters and the satellite, known parameters such as the satellite orbit and velocity, the shape of the Earth, can be used to register the data 55 to geographic coordinates. Since the satellite may perform multiple measurements of the same geographic area, either on a given orbital pass or subsequent passes, this data are iteratively processed 56 over multiple samples in order to refine the accuracy of calculations and detect changes and trends. Finally, the resulting data is formatted and stored for use 57. In particular, given the size of the data in multiple dimensions, various visualization techniques may be employed to understand the information revealed within the data.

In another embodiment, wherein multiple satellites are utilized to collect data, similar processing functions may be performed in parallel and notably combined at various stages of processing to produce value-added information on the features, composition, or geometry of the terrestrial transmitters.

Figure 9:
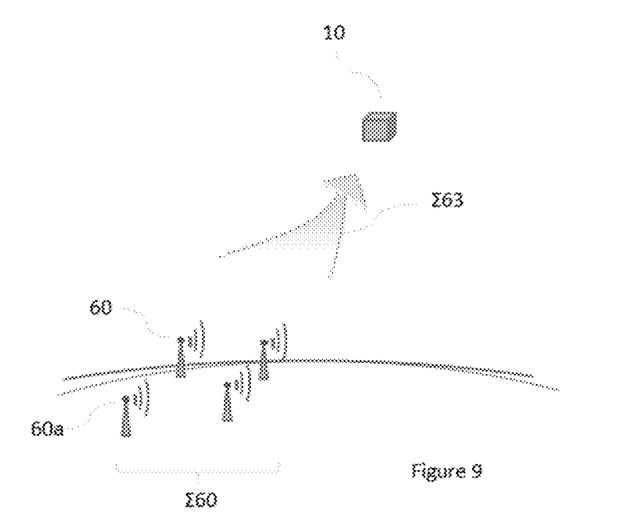
FIG. 9 is a schematic illustration of the method by which information regarding terrestrial transmissions can be determined by measurement of energy in aggregate in orbit.
Figure 10:
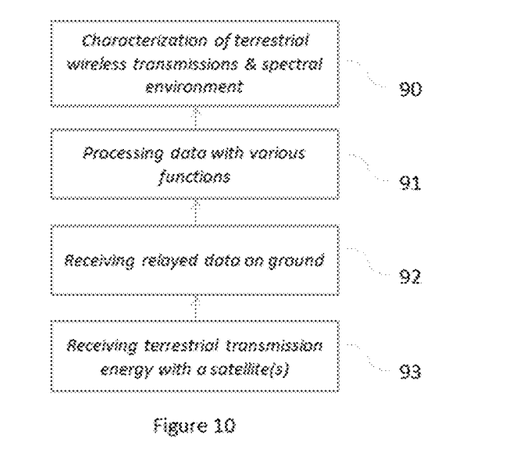
FIG. 10 is a flow diagram illustration of the method by which information regarding terrestrial transmissions can be determined.

In one embodiment, the aim of the method of detecting terrestrially transmitted energy is to better understand the nature of the transmissions. FIG. 9 illustrates a typical scenario, wherein multiple terrestrial transmitters 60 and 60a are sensed. A satellite 10 senses a sum of energy $\Sigma 63$ from the Earth. Through sensing, relay, and processing steps shown in the flow chart in FIG. 10, attributes of the system $\Sigma 60$ are produced. These attributes may include for instance aggregate power density, transmissions at specific frequencies, or types of transmissions being made, among others. In addition, further analysis of $\Sigma 63$ with sufficient resolution produces differentiating information of different transmitters 60 and 60a, such as frequency of operation, physical location, estimated power level, etc.

The detailed descriptions described above are intended to provide a skilled person a deeper understanding of the composition of the invention. Indeed further combinations and variations of the disclosed invention which are not mutually exclusive are possible, based on the specific implementation of the system. The descriptions therefore are not intended to be exhaustive or limit the scope of the invention in any way, but rather illustrate to a skilled person the parameters, components, function and exemplary embodiments of the invention.

A system for measuring, collecting, and/or analyzing terrestrial transmissions, being defined as emissions between one or more stations on the surface of Earth or within Earth's atmosphere, the system comprising:
one or a plurality of satellites in orbit around the Earth capable of receiving a portion of said transmissions and capable of transmitting energy, data or information to another satellite or ground station;
at least one ground station capable of receiving energy, data or information from at least one satellite; and
computerized processing functions performed to interpret the received energy, data and information.

The system of Claim 1, wherein the transmissions received by at least one satellite have a modulation and/or polarization.

The system of Claim 1, wherein at least one satellite is capable of transmitting energy, data or information to at least one ground station.

The system of Claim 1, wherein at least one satellite is capable of transmitting energy, data or information to another satellite (i.e. via an inter-satellite link) of claim 1 or another satellite (e.g. a data relay satellite).

The system of Claim 1, wherein at least one satellite is capable of receiving energy, data or information from at least one other satellite and is further capable of transmitting energy, data or information to a ground station and further is able to relay the received energy, data or information to the ground station.

A satellite wherein the inter-satellite link consists of at least one of:
radio-frequency transmissions;
optical transmissions; or transmissions using the Bluetooth communications standard.

The system of Claim 1, wherein at least one ground station receives energy, data or information from one satellite.

The system of Claim 1, wherein at least one ground station receives energy, data or information from multiple satellite simultaneously by using:
  at least one ground antenna which has a fixed orientation;
  at least one ground antenna which tracks the motion of the satellite or one of the satellites;
  multiple ground antennas, which are either fixed or track the motion of the satellite(s); and/or
  at least one ground antenna, which is either fixed or tracks the motion of the satellite(s) and which has a reception area which is capable of receiving from multiple satellites of Claim 1 simultaneously at a given time.

The system of Claim 1, wherein at least one ground station is capable of receiving energy, data or information from multiple satellites near-simultaneously using:
  a frequency-division multiple access scheme, wherein each satellite has a different assignment of frequencies;
  a time-division multiple access scheme, wherein each satellite utilizes a different assignment of time slots;
  a code-division multiple access scheme, wherein each satellite has a different code sequence assignment; or
  a combination of the above techniques (e.g. frequency- and time-division multiple-access).

The system wherein the transmission to at least one ground station is:
  a radio-frequency transmission; or
  an optical transmission.

The system of Claim 1, wherein multiple ground stations which are dispersed in varying geographical regions are utilized to receive energy, data or information from at least one satellite.

The system of Claim 1, wherein received energy, data, or information are temporarily stored on-board at least one of the satellites.

The system of Claim 1, wherein some processing is done on the received transmissions or portion thereof which identifies key observable signal attributes such as:
  frequencies of transmissions;
  bandwidths of transmissions;
  amplitudes of transmissions;
  polarizations of transmissions;
  modulation rates;
  waveform phase states;
  the rate or magnitude of change of any of the above over time.

The system of Claim 1, wherein some processing is done on the received transmissions or portion thereof in order to estimate, determine or calculate parameters such as:
  the power spectral density;
  the absence of transmissions in a given area;
  the number of transmitters in a given area;
  the disposition of transmitters in a given area on the surface of the Earth;
  the position of a given transmitter in a given area on the surface of the Earth; or
  the type (i.e. transmission format) of a given transmission.

The system of Claim 1, wherein the relative position of multiple satellites is exploited to perform power-difference, time-difference, or phase-difference processing of the received transmission or portion thereof.

The system of Claim 1 wherein the relative velocity of at least one satellite is exploited to perform frequency-difference processing of the received transmission or portion thereof.

The system of Claim 1 wherein the relative motion of at least one satellite is exploited to measure the same transmission from multiple positions.

The system of claim 1, wherein some processing is done in order to analyze co-channel signals by means such as:
  additions, subtractions, or correlation of the transmission received through a single antenna;
  additions or subtractions or correlation of the transmission received through different antennas;
  coherent integration of received energy according to given or detected transmission parameters;
  non-coherent integration of received energy according to given or detected transmission parameters; or
  iterative processing of the functions above.

The system of Claim 1, wherein the transmissions received by multiple antennas on one or more satellites are phase-coherently combined to form the output of a synthetic aperture array.

The system of Claim 1, wherein the transmissions received by a single antenna at different times are phase-coherently combined to form the output of a synthetic aperture array.

The system of Claim 1, wherein the processing is performed on-board at least one spacecraft, on-ground, or a combination thereof.

A method for operating a system of claim 1.

A method of:
  obtaining energy, data or information pertaining to terrestrial transmissions or portions thereof, by
  measuring, collecting or analyzing said transmissions or portions thereof with at least one satellite in orbit around the Earth
  and conveying that energy, data or information to at least one ground station,
  and processing, in one or more steps and in one or more locations, the received energy, data or information.

A method wherein a multitude of satellites work cooperatively to measure, collect or analyze said transmissions or portions thereof.

A method wherein processing outputs an indication of at least one of:
  the power spectral density;
  the existence or absence of transmissions in a given area;
  the number of transmitters in a given area;
  the disposition of transmitters in a given area on the surface of the Earth;
  the position of a given transmitter in a given area on the surface of the Earth; or
  the type (i.e. transmission format) of a given transmission.

A use of a system according to Claim 1, wherein energy, data or information is derived from at least one of:
  cellular transmissions or a portion thereof;
  fixed microwave transmissions or a portion thereof;
  broadcast transmissions or a portion thereof; or
  radar transmissions or a portion thereof; or
  transponder beacon transmissions or a portion thereof.

What is claimed is:

1. A system for collecting and analyzing terrestrial electromagnetic transmissions the system comprising:
  one or more satellites in orbit around the Earth, each satellite comprising a transceiver configured to:
    collect a plurality of samples of a terrestrial electromagnetic transmission of a type not reserved for satellite communications and not intended for geolocation or tracking of terrestrial objects, each sample comprising a plurality of key features associated with the transmission;

convert any analog samples to digital form using an analog-to-digital converter;

modulate each collected sample or its analog-to-digital conversion onto a carrier frequency reserved for satellite communications; and transmit the collected samples to a ground station on the modulated carrier frequency either directly or through another satellite; and a ground station comprising a receiver and computing device, the ground station configured to:

receive the plurality of samples of the terrestrial electromagnetic transmission;

analyze the key features of the samples to derive additional information about the transmission that is not contained in any single sample.

2. The system of claim 1, wherein the transmissions are at least one of:

mobile service transmissions;

fixed microwave transmissions;

broadcast transmissions;

radar transmissions; or transponder beacon transmissions.

3. The system of claim 1, wherein at least one satellite is orbiting in a Low Earth Orbit.

4. The system of claim 1, wherein a plurality of satellites form a constellation which enables substantially greater system coverage of the Earth at a given time, or phrased differently, which enables substantially shorter time between instances that at least one satellite is capable of receiving transmissions from a given place on earth.

5. The system of claim 1, wherein the plurality of satellites consists of a cooperative group of at least two satellites capable of simultaneously receiving a given transmission.

6. The system of claim 1, wherein all of the satellites have approximately the same altitude.

7. The system of claim 1, wherein at least one additional satellite is deployed or released from a first satellite once in orbit.

8. The system of claim 1, wherein the transceiver of at least one satellite is equipped with at least one passive sensor capable of receiving said transmissions and at least one transmitter capable of relaying the data to the ground station or to another satellite.

9. The system of claim 8, wherein the passive sensor is configured to:

scan continuously over a range of frequencies;

execute a series of pre-determined scans on prescribed frequencies at prescribed times; or rapidly tune the scanning range and sensitivity.

10. The system of claim 1, wherein the transceiver of at least one satellite is equipped with at least one passive sensor comprising:

an antenna with a reception area covering a portion of the Earth's surface;

a software-defined radio capable of tuning the sensor across a range of frequencies; and a processor capable of performing some functions, translations or transformations on received transmissions or portions thereof.

11. The system of claim 1, wherein at least one satellite has an antenna or antennas comprising:

a single wide-beam antenna capable of receiving energy within a substantial portion of the field of view of the surface of the Earth;

a single narrow-beam antenna capable of receiving energy within a limited portion of the field of view of the surface of the Earth;

multiple antennas with at least partially overlapping reception areas;

one or more antennas with boresight oriented approximately tangentially to the Earth's surface; or a combination of multiple antenna types described herein.

12. The system of claim 11, wherein the described antennas are disposed on at least more than one satellite.

13. The system of claim 1, wherein at least one satellite is able to rotate its orientation in order to change the orientation of the antenna and reception area.

14. The system of claim 1, wherein at least one satellite is able to rotate a given antenna independently in order to change the orientation of the reception area.

15. The system of claim 1, wherein the satellite also receives one or more transmissions from Global Navigation Satellite System(s) (e.g. the Global Positioning System) for purposes including but not limited to:

positional knowledge of the satellite; or timing reference; or frequency reference.

16. The system of claim 1, wherein at least one satellite is configured to receive energy with a frequency of between 100 MHz and 100 GHz.

17. A method for collecting terrestrial electromagnetic transmissions, comprising the steps of:

launching a satellite into orbit around the Earth, the satellite comprising a transceiver configured to receive terrestrial electromagnetic transmissions and re-transmit them on a carrier frequency reserved for satellite communications, and using the transceiver to perform the additional steps of:

collecting a plurality of samples of a terrestrial electromagnetic transmission of a type not reserved for satellite communications and not intended for geolocation or tracking of terrestrial objects, each sample comprising a plurality of key features associated with the transmission;

converting any analog samples to digital form using an analog-to-digital converter; and modulating each collected sample or its analog-to-digital conversion onto a carrier frequency reserved for satellite communications; and transmitting the collected samples to a ground station on the modulated carrier frequency either directly or through another satellite;

receiving the plurality of samples of the terrestrial electromagnetic transmission at a ground station comprising a receiver and computing device; and analyzing the key features of the samples using the computing device to derive additional information about the transmission that is not contained in any single sample.

* * * * *